March 16, 1965 A. H. GROSS 3,173,521
CABLE WAY CONNECTORS
Filed May 29, 1961 2 Sheets-Sheet 2
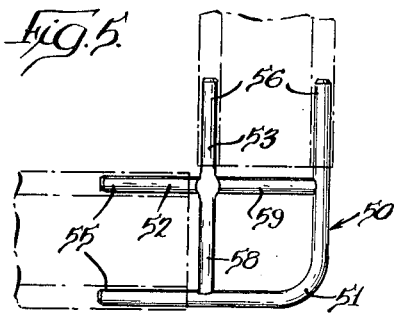
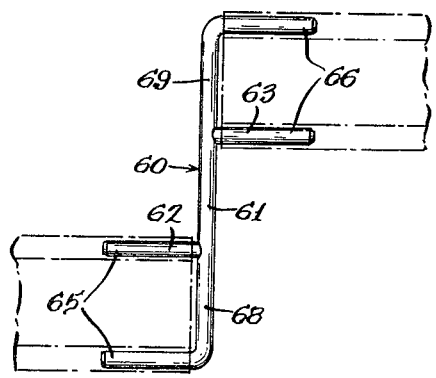
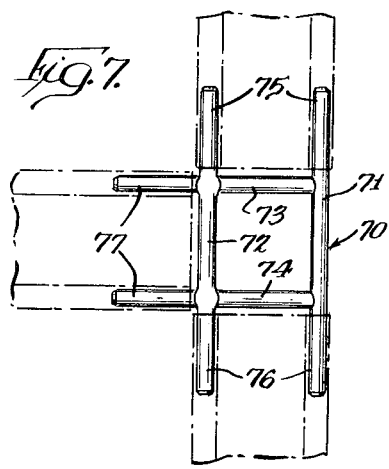
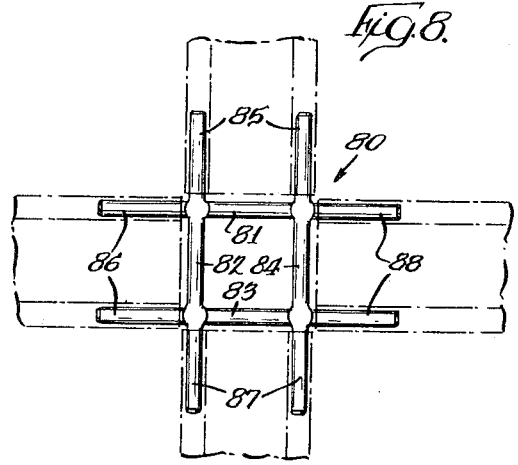
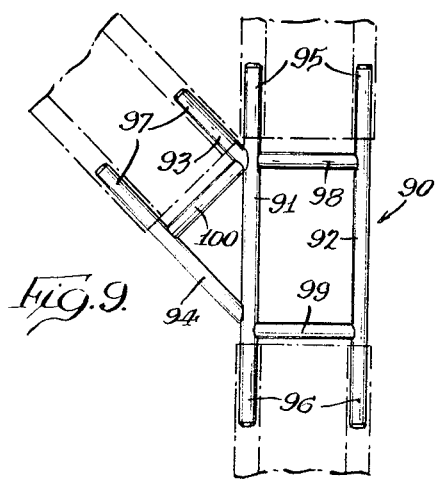
INVENTOR:
Albert H. Gross
BY
Gary, Desmond & Parker
Att'ys

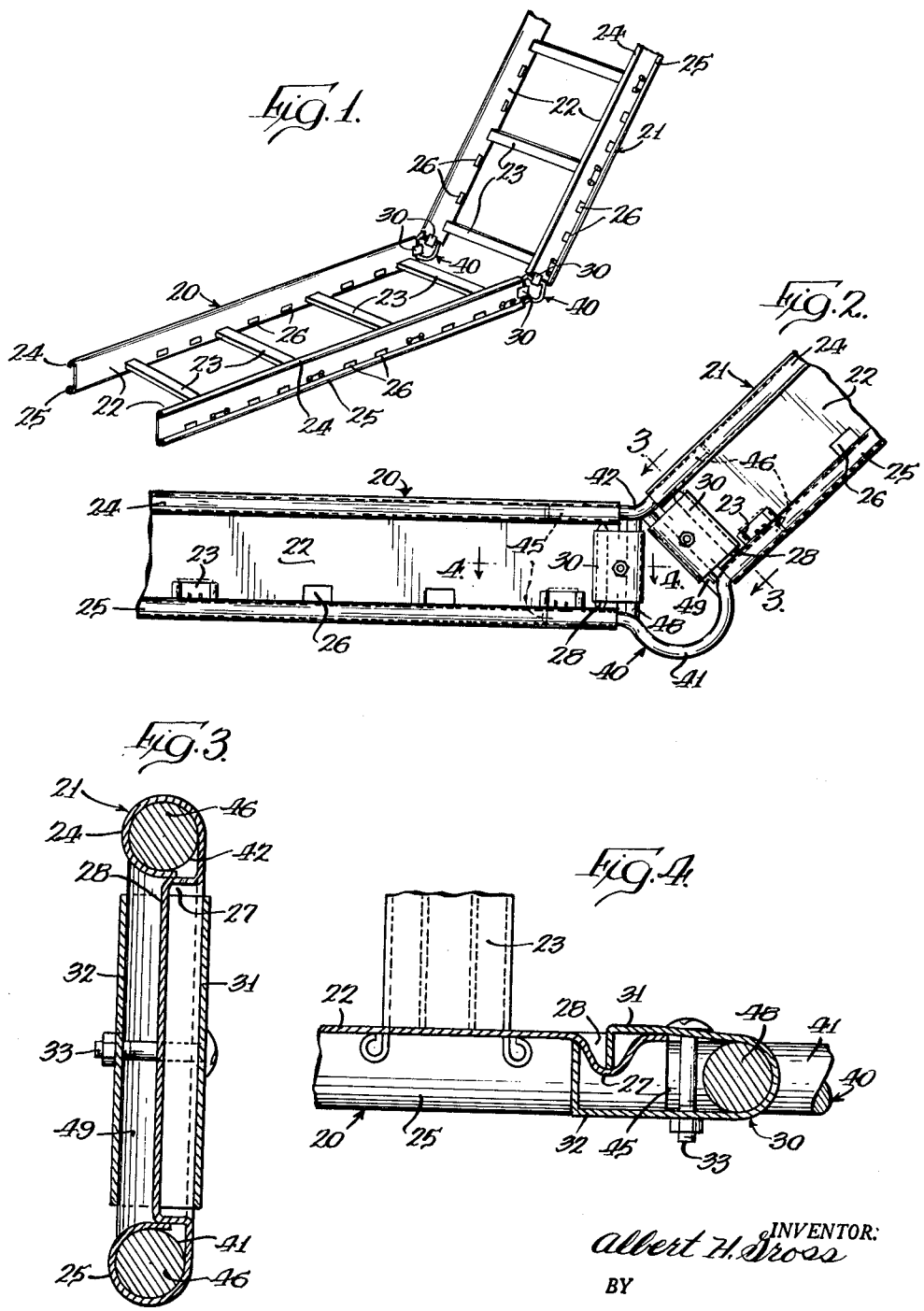

United States Patent Office 3,173,521
Patented Mar. 16, 1965

3,173,521
CABLE WAY CONNECTORS
Albert H. Gross, Itasca, Ill., assignor to H. K. Porter Company, Inc., Chicago, Ill., a corporation of Delaware
Filed May 29, 1961, Ser. No. 113,186
10 Claims. (Cl. 189—36)

The present invention relates to support trays or guidance ways for flexible electric power transmission cables, and particularly, to improved means for connecting adjacent sections of such ways.

It is common practice in the electrical industry to employ channel-shaped trays as support and guidance means or ways for insulated electric conductors. The trays are usually formed in sections which are adapted to be coupled together in end-to-end relation and at various angles to guide cables along a selected path or paths. In accordance with the basic proposal, the sections must be capable of interconnection at various angles in the vertical plane, in vertically offset relation and in vertical Y's, T's and crosses. Heretofore, separate connecting tray sections have been fabricated in each of a plurality of forms, including 30 degree, 45 degree, 60 degree and 90 degree inside bend elbows, 30 degree, 45 degree, 60 degree and 90 degree outside bend elbows, single offsets, multiple offsets, Y's, T's and crosses, each in a plurality of different widths; which connector sections have posed serious problems with respect to cost, space requirements and inventory.

The object of the present invention is to provide improved means for interconnecting cable way sections that are economical to produce and simple and economical to install; that require little space, both in installation and for inventory purposes; and that form a rigid interconnection between adjacent cable way sections.

Another object of the invention is the provision of improved connectors eliminating the prior requirement for connecting sections of various widths.

An additional object of the invention is to provide improved elbow connectors eliminating the prior requirement for separate inside and outside bend connecting sections.

A further object of the invention is the provision of improved cable way connectors eliminating the prior requirement for tray or channel-shaped connecting sections and comprised simply of pieces of rod welded together in a selected formation in a single plane; two such connectors being employed at respective sides of the tray sections to be connected.

A still further object of the invention is the provision of improved clamp means for rigidly securing the tray sections and the connectors in assembled relation.

Other objects and advantages of the invention will become apparent in the following detailed description.

Now, in order to acquaint those skilled in the art with the manner of making and using my improved cable way connectors, I shall describe, in connection with the accompanying drawings, several embodiments of vertical cable way connectors and the preferred manners of making and using the same, from which the full applicability of the invention will become apparent to those skilled in the art.

In the drawings:

FIGURE 1 is a perspective view of a pair of cable way trays of the well-known ladder type interconnected in accordance with the present invention at a vertical angle of 45 degrees;

FIGURE 2 is a side elevation, on an enlarged scale, of the tray connection of FIGURE 1;

FIGURE 3 is a sectional view, on a further enlarged scale, taken substantially on line 3—3 of FIGURE 2;

FIGURE 4 is a horizontal sectional view taken substantially on line 4—4 of FIGURE 2;

FIGURES 5 through 9 are side elevational views of various representative connectors made in accordance with the present invention; the connectors comprising, respectively, a 90 degree elbow, a multiple offset, a T, a cross and a Y; and FIGURE 10 is a sectional view depicting the formation of the connectors at points of rod intersection.

Referring now to the drawings, and particularly to FIGURES 1 to 4, I have shown a 45 degree vertical inside bend cable tray connection effected in accordance with my invention. The cable tray sections, indicated at 20 and 21, are of the well-known ladder type and are each comprised of a pair of upright side walls 22 and a plurality of longitudinally spaced transverse rungs 23 extending between and secured to the side walls adjacent their lower edges. In a conventional commercial embodiment, each tray section is approximately 10 feet long and 3 inches high, and is available in various widths, such as 6 inches, 9 inches, 12 inches, 18 inches and 24 inches. By simply varying the length of the rungs 23, these various widths are readily provided; and the side walls 22 may be economically produced in volume in standard 3 inch by 10 foot size.

The side walls 22 of each tray section are of identical construction. Each wall comprises a strip of sheet metal rolled outwardly at its upper and lower edges to define vertically spaced, outwardly facing tubular portions 24 and 25. Immediately above the lower tube 25, rectangular apertures 26 are provided at equal spacings in the side wall for reception of the rungs 23. Adjacent each end thereof, between the tubular portions 24 and 25, each side wall is die stamped to bulge a portion of the wall outwardly, thereby to form a vertically extending protrusion 27 between the tubes and a corresponding indentation 28 in the inner surface of the tray side wall.

The rungs 23 are preferably formed of sheet metal bent into generally rectangular cross-section and including imperforate top and side walls, bottom wall portions and bracing flanges bent into the interior of the rung from said bottom wall portions. The side walls are longer than the remainder of the rung and are of less height at their ends, whereby said ends may be passed through the apertures 26 in the side walls 22, the side walls may be butted against the top and bottom wall portions of the rungs, and said ends may be rolled over the side wall as shown in FIGURE 4 rigidly to secure the rungs and side walls together. The rung apertures are preferably disposed on 4 inch centers, and rungs may be mounted in all or only some of the apertures depending upon the conditions of use.

With reference to FIGURES 1 to 4, two such tray sections are interconnected at a 45 degree vertical angle in accordance with my invention by the use essentially of two exceedingly simply unitary connectors 40. Each connector is comprised entirely of metal rod of a diameter to fit snugly into the tubular portions 24 and 25 of the tray side walls. A suitable material is 9/16 inch diameter steel rod. In the particular embodiment, two rods 41 and 42 are bent into 45 degree angle form, the rod 42 on the inside or short side of the bend being relatively short and the rod 41 on the outside or long side of the bend being relatively long so that the two rods, when spaced apart at their ends by a distance equal to the separation of the tubular portions 24 and 25 of the side walls 22 will define a first pair 45 of spaced parallel coextensive rod ends and a second pair 46 of spaced parallel coextensive rod ends, the pairs of ends extending at 45 degrees to one another. The rod ends are freely extending, and may be of such length as desired, a suitable length being 3 inches. Rigidly to unite the two pairs of rod ends 45 and 46, I provide intermediate rod portions including the integral intermediate parts of the two rods 41 and 42 and a pair of transverse braces 48 and 49 extending respectively between the bases of the rod ends 45 and 46. Specifically, the braces 48 and 49 are disposed at right angles to the respective rod ends 45 and 46 at a location 3 inches inwardly from the outer ends thereof. Preferably, the braces are welded at their ends to the intermediate parts of the rods 41 and 42, thereby to define a unitary, flat, planar connector.

One pair of rod ends 45 of one connection are inserted in the tubular portions 24 and 25 of one wall of one tray section 20, and the corresponding ends 45 of a second connector are inserted in the same fashion and direction in the tubular portions of the other wall of the same tray section. Then, the other pairs of rod ends 46 of the connectors are inserted in corresponding tubular portions of the respective walls of the other tray section 21, thereby to interconnect the tray sections at the selected angle, i.e., 45 degrees. By using the two connectors 40 in the direction shown in FIGURE 2, a 45 degree inside bend is formed. By inverting the connectors 40, a 45 degree outside bend would be formed. Thus, the connectors 40, which are identical, accommodate both inside and outside bends in a single embodiment. Moreover, any two such connectors each of which in a preferred embodiment is only 7½ inches tall, 8½ inches long and 9/16 inch thick, substitute for and replace (in the previously stated tray widths of 6 inches, 9 inches, 12 inches, 18 inches and 24 inches) twenty different 45 degree outside bend elbows ranging in size from 11½ inches long, 6¼ inches tall and 6 inches wide to 31¼ inches long, 14½ inches tall and 24 inches wide, and twenty different 45 degree inside bend elbows ranging in size from 10¾ inches long, 7⅛ inches tall and 6 inches wide to 30½ inches long, 15⅜ inches tall and 24 inches wide. The consequent convenience and economy in manufacture, inventory, cataloging and ordering are of course obvious.

To complete the connection above described, I prefer to provide clamp means between the connectors 40 and each tray section. Specifically, I provide clamp means 30 each of which comprises finger means embracing a respective transverse brace or strut 48 or 49 and including a relatively short inner finger 31 disposed adjacent the inner surface of the side wall 22 and having a bent end engageable in the indentation 28 and a relatively long outer finger 32 extending along the outer side of the wall and having a bent end engaging over the protrusion 27 resulting from formation of the indentation. To secure the clamp in position, a bolt 33 or like fastener is extended through the fingers 31 and 32 between the strut 48 or 49 and the end of the tray wall 22, whereby the fingers are interlocked with the tray side wall. While each clamp is shown as an integral piece, the same may if desired be formed of two separate channel-shaped finger pieces. Also if desired, the wall 22 may be notched or pierced at its end for passage of the bolt 33. While two of the clamps 30 would probably suffice for each connection, I prefer to use four such clamps, as shown in FIGURE 1, rigidly to unite all four corners of each connection.

As will be appreciated, 30 degree, 60 degree and 90 degree elbows may be fabricated in essentially the same manner as, and will afford the same advantages as, the 45 degree bend connectors above described. By way of further example, I have shown in FIGURE 5 a 90 degree elbow connector 50 which is comprised of three pieces of rods 51, 52 and 53. The rod 51 is relatively long and is bent into a 90 degree angle to form the long side of the bend. The rods 52 and 53 are relatively short and are disposed at intersecting right angular relation perpendicular to respective straight portions of the rod 51 within the curve and the plane of the latter to define the short side of the bend, whereby the rods define two pairs 55 and 56 of coplanar right angularly related rod ends, the rod ends being interconnected at their bases by an essentially square framework comprised of parts of the rods 51, 52 and 53, two sides of this square constituting transverse braces 58 and 59 between the rod ends of each pair. The three rods are preferably welded together at their meeting points, the rods 52 and 53 at their point of intersection being pressed or squeezed together into coplanar relation, as depicted in FIGURE 10, and being welded at that point, whereby each connector 50 comprises a unitary planar member. By using the connector in inverted positions, the connector will form both inside and outside 90 degree bends. Also, as with the 45 degree connectors, a single pair of these thin flat connectors will substitute for and replace forty different styles and sizes of the previously used tray-type elbows, namely twenty inside bends ranging in size from 12¼ by 12¼ by 6 to 40¼ by 40¼ by 24 and twenty outside bends having the same size range. In like manner, 30 degree elbows made in accordance with the present invention substitute for forty different 30 degree tray-type elbows, and my 60 degree elbows substitute for another forty different 60 degree tray-type elbows.

As a consequence of the foregoing, it is to be appreciated that the present invention, as applied only to vertical elbows, utilizes only four piece parts, each of compact, economical construction, in place of 160 different prior art tray elements of complicated, expensive and bulky fabrication.

Considering now other vertical connections, reference is made to FIGURE 6 which discloses an offset vertical connector. The amount of offset may be a fraction of the tray height or any multiple thereof, and the connector of the invention may be used for step-up or step-down connections as desired. By way of example, I have shown a multiple offset connector 60 consisting of three rods 61, 62 and 63. The rod 61 is relatively long and is bent to define a pair of vertically spaced rod ends and an intermediate straight connecting portion therebetween. The rods 62 and 63 are simply of a length to constitute rod ends and are welded to the central connecting portion of the rod 61 in spaced parallel coextensive relation to respective ones of the ends defined by that rod, whereby the connector includes a pair of rod ends 65 spaced vertically and extending in the opposite direction from a second pair of rod ends 66, and whereby the vertical portion of the rod 61 defines transverse braces 68 and 69 between respective pairs of rod ends.

In FIGURE 7, I have shown a vertical T connector 70 comprised of four rods 71, 72, 73 and 74. The rods 71 and 72 are relatively long and are disposed in spaced parallel coextensive relation to define a first pair of rod ends 75, an oppositely disposed second pair of rod ends 76 and intermediate connecting portions. The rods 73 and 74 are shorter than the rods 71 and 72 by the rod end length of the connector and are disposed in spaced parallel coextensive relation to one another at right angles to the rods 71 and 72. The rods 73 and 74 at one end are welded to the rod 71 at the bases of the rod ends defined thereby and intersect the rod 72 at corresponding locations. The rods 73 and 74 thus form a third pair of rod ends 77 disposed centrally between and at right angles to the rod ends 75 and 76, and their remaining portions together with the intermediate portions of the rods 71 and 72 form a square connecting frame for the rod ends, three sides of which square define transverse braces for the respective pairs of rod ends. At the points of intersection of the rods 73 and 74 with the rod 72, the rods are preferably pressed into coplanar relation as depicted in FIGURE 10, and welded together.

The connector illustrated in FIGURE 8 comprises a vertical cross connector 80 and it is constructed in essentially the same manner as the T connector 70, except that four rods 81, 82, 83 and 84 of equal length are disposed in mutually intersecting relation to define four pairs of rod ends 85, 86, 87 and 88 which are disposed at equal circumferential spacings of 90 degrees. The intermediate portions of the four rods consequently define an interconnecting square framework each leg or side of which comprises a transverse brace for a respective pair of the rod ends. At points of intersection, the rods are pressed into coplanar relation and welded together, as shown in FIGURE 10.

The one remaining form of standard vertical connector is a Y, and I have illustrated a preferred form of such connection in FIGURE 9. According to my invention, the Y 90 is comprised of four rods 91, 92, 93 and 94, two of which are relatively long straight rods disposed in spaced parallel coextensive relation to define two pairs of rod ends 95 and 96, respectively. One of the remaining rods 93 is simply a rod end and the same is welded to the rod 91 adjacent the base of a rod end defined thereby at an angle of approximately 45 degrees. The fourth rod 94 parallels the rod 93 and is of a length to define a rod end portion disposed in spaced parallel coextensive relation to the rod 93 and a connecting portion extending to and welded onto the rod 91, thereby to define a third, angularly related pair of rod ends 97. Then, the unit is completed by the provision of three short rods forming transverse braces 98, 99 and 100 between the bases of respective pairs of rod ends.

In all of the vertical connector units above described, each connector is a flat planar unitary element, and only two elements are required to effect any of the described connections. The compactness and simplicity of the units afford many advantages in terms of economy of manufacture, convenience and consequent economies of storage, inventory and ordering of both raw materials and finished units, reduction in the number, styles and sizes of connectors required, and ease of installation. Thus, all of the objects and advantages of the invention have been shown herein to be attained in a convenient, economical and practical manner.

While I have shown and described what I regard to be representative preferred embodiments of my invention, it will be appreciated that various changes, rearrangements and modifications may be made therein without departing from the scope of the invention, as defined by the appended claims.

I claim:

1. Vertical junction connecting means for a pair of cable tray sections each having spaced parallel side walls each of which includes spaced parallel tubular portions, comprising a pair of substantially identical connectors each consisting essentially of a coplanar assembly of rods rigidly connected to one another, each connector including a first pair of rod ends for entry into the tubular portions of a respective side wall of one tray section, a second pair of rod ends for entry into the corresponding tubular portions of the respective side wall of the other tray section and intermediate rod portions rigidly interconnecting said rod ends and including transverse braces between the bases of each pair of rod ends, said braces being adapted to abut the ends of the tray section side walls to limit insertion of said rod ends into the tubular portions, said rod ends and intermediate rod portions of each connector lying substantially in a common plane and connecting corresponding sides of the two tray sections together in respective planes.

2. Connecting means for a pair of cable tray sections each having spaced parallel side walls each of which includes spaced parallel tubular portions, comprising a pair of connectors each including a first pair of rod ends for entry into the tubular portions of a respective side wall of one tray section, a second pair of rod ends for entry into the corresponding tubular portions of the respective side wall of the other tray section and intermediate rod portions rigidly interconnecting said rod ends and including transverse braces between the bases of each pair of rod ends, and clamp means between each transverse brace and the adjacent side wall of the adjacent tray section comprising finger means embracing the respective brace and interlockingly engaging the side wall of the respective tray section.

3. Connecting means for a pair of cable tray sections each having spaced parallel side walls, a pair of spaced tubular portions on each side wall and an indentation in each side wall adjacent the end and between the tubular portions thereof, comprising a pair of connectors each including a first pair of rod ends for entry into the tubular portions of a respective side wall of one tray section, a second pair of rod ends for entry into the corresponding tubular portions of the respective side wall of the other tray section and intermediate rod portions rigidly interconnecting said rod ends and including transverse braces between the bases of each pair of rod ends, and clamp means between each transverse brace and the adjacent side wall of the adjacent tray section comprising finger means embracing the respective brace and including a short finger disposed adjacent the indented surface of the tray side wall having an end engageable in said indentation and a long finger disposed adjacent the opposite surface of the tray side wall having an end engageable over the protrusion resulting from the aforesaid indentation.

4. In a cable tray connection wherein the tray side walls are indented adjacent their ends and the connecting means includes a strut generally paralleling the end of the wall; clamp means between the tray and the connecting means comprising finger means embracing the strut and extending adjacent the opposite surfaces of the tray side wall and having end portions interlockingly engaged with the indentation in the wall.

5. Vertical junction connecting means for a pair of cable tray sections each having spaced parallel side walls each of which includes spaced parallel tubular portions, comprising a pair of substantially identical connectors each consisting essentially of a coplanar assembly of rods rigidly connected to one another, each connector including a first pair of rod ends for entry into the tubular portions of the respective side wall of one tray section, a second pair of rod ends extending at an angle away from said first pair of rod ends for entry into the corresponding tubular portions of the respective side wall of the other tray section and intermediate rod portions rigidly interconnecting said rod ends and including transverse braces between the bases of each pair of rod ends, said braces being adapted to abut the ends of the tray section side walls to limit insertion of said rod ends into the tubular portions, said connectors connecting the two tray sections together at an angle to one another with the corresponding side walls of the sections disposed in substantially common respective planes.

6. Vertical junction connecting means for a pair of cable tray sections each having spaced parallel side walls each of which includes spaced parallel tubular portions, comprising a pair of substantially identical connectors each consisting essentially of a co-planar assembly of rods rigidly connected to one another, each connector including a first pair of rod ends for entry into the tubular portions of the respective side wall of one tray section, a second pair of rod ends extending in the direction opposite said first pair of rod ends and offset therefrom for entry into the corresponding tubular portions of the respective side wall of the other tray section and intermediate rod portions rigidly interconnecting said rod ends and including transverse braces between the bases of each pair of rod ends, said braces being adapted to abut the ends of the tray section side walls to limit insertion of said rod ends into the tubular portions, said connectors connecting the two tray sections together in vertically offset relation to one another with the corresponding side walls of the sections disposed in substantially common respective planes.

7. Vertical junction connecting means for three cable tray sections each having spaced parallel side walls each of which includes spaced parallel tubular portions, comprising a pair of substantially identical connectors each consisting essentially of a co-planar assembly of rods rigidly connected to one another, each connector including three pairs of spaced parallel rod ends extending in respective directions spaced circumferentially from one another in the plane of the connector for entry into the corresponding tubular portions of a respective side wall of respective ones of the three tray sections and intermediate rod portions rigidly interconnecting said rod ends and including transverse braces between the bases of each pair of rod ends, said braces being adapted to abut the ends of the tray section side walls to limit the insertion of said rod ends into the tubular portions, said connectors connecting the three tray sections together at respective angles to one another with the corresponding side walls of the sections disposed in substantially common respective planes.

8. Vertical junction connecting means for three cable tray sections each having spaced parallel side walls each of which includes spaced parallel tubular portions, comprising a pair of substantially identical connectors each consisting essentially of a coplanar assembly of rods rigidly connected to one another, each connector including three pairs of spaced parallel rod ends extending in respective directions spaced circumferentially from one another in the plane of the connector for entry into the corresponding tubular portions of a respective side wall of respective ones of the three tray sections, said pairs of rod ends being arranged in the form of a Y, and intermediate rod portions rigidly interconnecting said rod ends and including transverse braces between the bases of each pair of rod ends, said braces being adapted to abut the ends of the tray section side walls to limit insertion of said rod ends into the tubular portions, said connectors connecting the three tray sections together in the form of a Y with the corresponding side walls of the sections disposed in substantially common respective planes.

9. Vertical junction connecting means for three cable tray sections each having spaced parallel side walls each of which includes spaced parallel tubular portions, comprising a pair of substantially identical connectors each consisting essentially of a coplanar assembly of rods rigidly connected to one another, each connector including three pairs of spaced parallel rod ends extending in respective directions spaced circumferentially from one another in the plane of the connector for entry into the corresponding tubular portions of a respective side wall of respective ones of the three tray sections, said pairs of rod ends being arranged in the form of a T, and intermediate rod portions in the form of a square rigidly interconnecting said rod ends with three sides of the square comprising transverse braces between the bases of respective pairs of rod ends, said braces being adapted to abut the ends of the tray section side walls to limit insertion of said rod ends into the tubular portions, said connectors connecting the three tray sections together in the form of a T with the corresponding side walls of the sections disposed in substantially common respective planes.

10. Vertical junction connecting means for four cable tray sections each having spaced parallel side walls each of which includes spaced parallel tubular portions, comprising a pair of substantially identical connectors each consisting essentially of a coplanar assembly of rods rigidly connected to one another, each connector including four pairs of spaced parallel rod ends extending in respective directions spaced circumferentially from one another in the plane of the connector for entry into the corresponding tubular portions of a respective side wall of respective ones of the four tray sections, and intermediate rod portions in the form generally of a square rigidly interconnecting said rod ends with the four sides of the square comprising transverse braces between the bases of respective pairs of rod ends, said braces being adapted to abut the ends of the tray section side walls to limit insertion of said rod ends into the tubular portions, said connectors connecting the four tray sections together in essentially the form of a cross with the corresponding side walls of the sections disposed in substantially common respective planes.

References Cited in the file of this patent

UNITED STATES PATENTS

| | | |
|---|---|---|
| 2,048,378 | Hafner | July 21, 1936 |
| 2,081,682 | Smith | May 25, 1937 |
| 2,218,545 | Morten | Oct. 22, 1940 |
| 2,342,537 | Geisler | Feb. 22, 1944 |
| 2,699,348 | Fulop | Jan. 11, 1955 |
| 2,932,368 | Schell | Apr. 12, 1960 |

FOREIGN PATENTS

| | | |
|---|---|---|
| 596,242 | Italy | July 10, 1959 |